United States Patent
Heid (10) Patent No.: US 9,520,590 B2
(45) Date of Patent: Dec. 13, 2016

(54) SEALABLE TERMINAL FOR RECHARGEABLE BATTERY

(71) Applicant: Wegmann automotive GmbH & Co. KG, Veitshöchheim (DE)

(72) Inventor: Andreas Heid, Hausen bei Würzburg (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 0 days.

(21) Appl. No.: 14/885,426

(22) Filed: Oct. 16, 2015

(65) Prior Publication Data

US 2016/0043377 A1 Feb. 11, 2016

Related U.S. Application Data

(63) Continuation of application No. PCT/EP2014/061796, filed on Jun. 6, 2014.

(30) Foreign Application Priority Data

Jun. 14, 2013 (EP) ..................................... 13172004

(51) Int. Cl.
*H01M 2/30* (2006.01)
*H01M 2/06* (2006.01)
(Continued)

(52) U.S. Cl.
CPC ........ *H01M 2/307* (2013.01); *B29C 45/14344* (2013.01); *B29C 45/36* (2013.01);
(Continued)

(58) Field of Classification Search
None
See application file for complete search history.

(56) References Cited

U.S. PATENT DOCUMENTS

2011/0250493 A1 10/2011 Balzan .................. 429/179

FOREIGN PATENT DOCUMENTS

CN 102859745 A 1/2013
DE 10 2010 022 584 12/2011
(Continued)

OTHER PUBLICATIONS

Search Report in International Application No. PCT/EP2014/061796 mailed Aug. 19, 2014.
(Continued)

*Primary Examiner* — Sarah A Slifka
(74) *Attorney, Agent, or Firm* — Norton Rose Fulbright US LLP (57) ABSTRACT

A terminal for a battery has a mounting section and a contacting section. There is a torque ring between the mounting section and the contacting section. The mounting section is for holding the terminal within a battery cover, into which it preferably is injection molded. The terminal is a hollow body, which has an outer surface and an inner surface. At the contacting section, the outer surface is conically shaped. At the mounting section, the outer surface has at least one labyrinth ring forming a labyrinth. The inner surface comprises at least two sections. An upper section is essentially surrounded by the contacting section, and preferably has a conical shape. A lower section is essentially surrounded by the mounting section. The lower section preferably has a concave cross-sectional shape. Between the upper section and the lower section, there is an edge. The edge at the inner surface may be essentially surrounded by the torque ring at the outer surface.

13 Claims, 7 Drawing Sheets

(51) Int. Cl.
*B29C 45/14* (2006.01)
*B29C 45/36* (2006.01)
*H01M 2/04* (2006.01)
*H01M 10/12* (2006.01)
*B29K 101/00* (2006.01)
*B29L 31/00* (2006.01)

(52) U.S. Cl.
CPC ......... *H01M 2/043* (2013.01); *H01M 2/0482* (2013.01); *H01M 2/06* (2013.01); *B29C 2045/366* (2013.01); *B29K 2101/00* (2013.01); *B29L 2031/7146* (2013.01); *H01M 10/12* (2013.01); *H01M 2220/20* (2013.01)

(56) References Cited

FOREIGN PATENT DOCUMENTS

| | | |
|---|---|---|
| DE | 10 2010 033 645 | 2/2012 |
| EP | 1 347 522 | 9/2003 |
| EP | 2099084 | 9/2009 |
| JP | S57 180872 | 11/1982 |
| JP | H05-283057 | 10/1993 |
| JP | 2002-313315 | 10/2002 |
| JP | 2013-007974 | 1/2013 |
| JP | 2013-097974 | 5/2013 |
| JP | 2013-229161 | 11/2013 |

OTHER PUBLICATIONS

Decision to grant a European Patent pursuant to Article 97(1) EPC in European Application No. 13172004.7 dated Jul. 16, 2015.
Office Action in Chinese Application No. 201480026378.7 dated Feb. 26, 2016.

SEALABLE TERMINAL FOR RECHARGEABLE BATTERY

PRIORITY CLAIM

This application is a continuation of co-pending International Application No. PCT/EP2014/061796 filed on Jun. 6, 2014, which designates the United States and claims priority from European Application No. 13172004.7 filed on Jun. 14, 2013, each of which is incorporated herein by reference in its entirety.

BACKGROUND OF THE INVENTION

1. Field of the Invention

The invention relates to terminals for rechargeable batteries, also called connecting poles, for rechargeable batteries, particularly for connecting poles of batteries, specifically lead acid batteries, also called accumulators. Another aspect of the invention relates to covers for housings and/or housings of such batteries and such batteries.

2. Description of Relevant Art

A terminal for a battery which can be molded into the battery cover and has a plurality of grooves forming a labyrinth seal, is disclosed in the European patent publication EP 0 601 268 B1.

A battery terminal forming a plurality of longitudinal channels or recesses formed in an interior surface portion is disclosed in US 2011/0250493.

In the US patent publication U.S. Pat. No. 6,030,723, a lead bushing is disclosed, which is connected to a terminal post of a battery by a conductive adhesive. To simplify insertion of the terminal post into the lead bushing, the terminal post has a significantly smaller diameter than the lead bushing. The gap between the terminal post and the lead bushing is filled by said conductive adhesive.

SUMMARY OF THE INVENTION

The embodiments are based on the object of providing a terminal for a battery, which provides an improved sealing and an improved mechanical stability. Furthermore, the terminal should allow easy assembly of the battery and therefore inserting of the terminal post into the terminal during assembly with a low friction. The process of manufacturing the terminal and the process of injection molding a battery cover should be simplified and should be made more precise and reliable.

In a first embodiment, a terminal for a battery has a mounting section and a contacting section. There is a torque ring between the mounting section and the contacting section, which preferably has tooth-shaped protrusion. The mounting section is for holding the terminal within a battery cover, into which it preferably is injection molded. The battery is externally connected by the contacting section. The terminal is a hollow body, which has an outer wall (or surface) and an inner wall (or surface). At the contacting section, the outer wall preferably is conically shaped with decreasing diameter to the upper side of the terminal. At the mounting section, the outer wall preferably has at least one circumferential projection forming a labyrinth. This is further referred to as labyrinth ring. The inner wall comprises at least two sections. An upper section is essentially surrounded by the contacting section, and preferably has a conical shape with decreasing diameter to the upper side of the terminal. It may also have a cylindrical shape. A lower section is essentially surrounded by the mounting section. The lower section preferably has in a lateral sectional view a concave shape. Between the upper section and the lower section, there is an edge. The edge at the inner wall is essentially surrounded by the torque ring at the outer wall.

The concave lower section of the inner wall provides space for plastic material of the battery cover. While battery terminals as known in the prior art are only held by their outer walls within the battery cover, this embodiment of a terminal is completely embedded into the material of the battery cover in its mounting section, including the outer wall and the inner wall of the terminal. This gives enhanced stability to the battery terminal and results in a significantly higher retention force. This is not comparable to thin sliding elements. In contrast thereto, there is space for a significant layer of the battery cover's material covering the inner wall of the terminal's mounting section. The thickness of the battery cover's material may be 1 mm or more, preferably 3 mm. For molding a terminal into a battery cover, a pin of a molding tool is inserted into the terminal to limit the flow of the battery cover's material within the terminal. A circular edge at the inner wall of the terminal between the upper section and the lower section is in contact with the pin of the molding tool and ensures sealing of the area into which the battery cover's material can flow. This results in a clear limit of the battery cover's material to the lower section of the terminal.

The circular edge preferably is pressed against the pin of the molding tool. To obtain a secure sealing, the pin of the molding tool must at least closely fit into the diameter of the circular edge. The pin of the molding tool may also be pressed into the terminal, extending the inner diameter of the circular edge slightly. Therefore it is preferred, if the circular edge is opposed to the protrusion at the outer wall of the terminal, as this protrusion acts as a reinforcement and allows absorbing of comparatively high forces without deformation of the terminal.

In a further embodiment, the mounting section has a decreasing material thickness starting from the torque ring to the end of the mounting section. As the possible holding forces decrease towards the end of the mounting section due to the anchoring forces of the labyrinth rings, the thickness of the walls can be reduced, thus saving further material and mass.

Another embodiment relates to a battery cover having at least one terminal as described herein.

Another embodiment relates to a battery having at least one terminal and/or a battery cover as described herein.

A further embodiment relates to a method of molding a terminal into a battery cover. The battery cover may by die cast or pressure molded by using a molding tool having the shape of the battery cover. First, a pin of the molding tool is pushed into the terminal until the pin is in circular contact with the edge. It is understood, that it is the same, if the terminal is pushed on the pin, which may be done when inserting the terminal into the tool. Furthermore, the tool is closed. Pushing the pin into the terminal may also be done during or by closing the form. Next, the molding tool is filled with a plastic material, preferably allowing the plastic material to essentially enclose the mounting section. After the plastic material has cooled down, so that it is no more liquid, the form is opened and the pin is removed from the terminal. Removing the pin may be done with opening the tool or before or after opening, but not as long as the plastic material is liquid.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
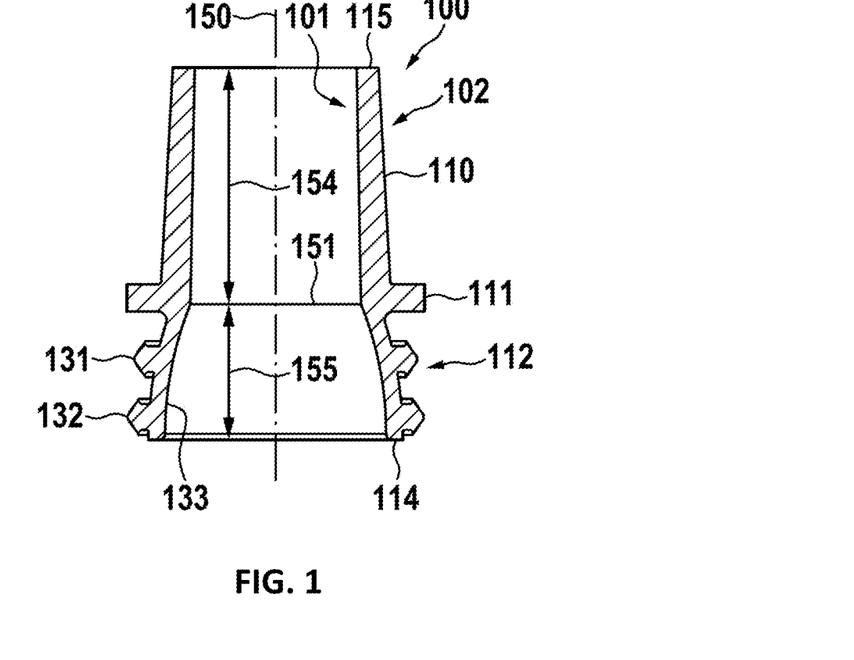
FIG. 1 shows a preferred embodiment of a battery terminal.

In FIG. 1, a preferred embodiment of a battery terminal 100 is shown. The battery terminal has a contacting section 110 for contacting the battery, and a mounting section 112 for mounting and holding the terminal within a battery cover. Between the contacting section 110 and the mounting section 112 is a torque ring 111, which provides a high torque resistance to the terminal. Preferably, the mounting section has at least one, preferably two labyrinth rings 131, 132. The terminal is a hollow body, wherein most of the body, with exception of the torque ring, is rotationally symmetrical around a center axis 150. It has an inner wall 101 and an outer wall 102. The inner wall 101 has an upper section 154 and a lower section 155. Between these sections, there is a circular edge 151. This circular edge between the sections is located opposite to the torque ring at the outer wall 102. Preferably, the upper section 154 has a slightly conical shape with decreasing diameter to the upper side of the terminal. It has a decreasing cross-section starting from the circular edge 151 to the top side 115 of the terminal. In an alternate embodiment, it may be cylindrical. The lower section 155 has a decreasing cross-section from the outside to the bottom side 114 of the terminal to the circular edge 151. In a longitudinal section, the shape of the inner wall in the lower section 155 is concave. Such a concave shape allows to better form the circular edge 151 and furthermore allows at the end of the terminal a larger distance from the center axis 150.

Figure 2:
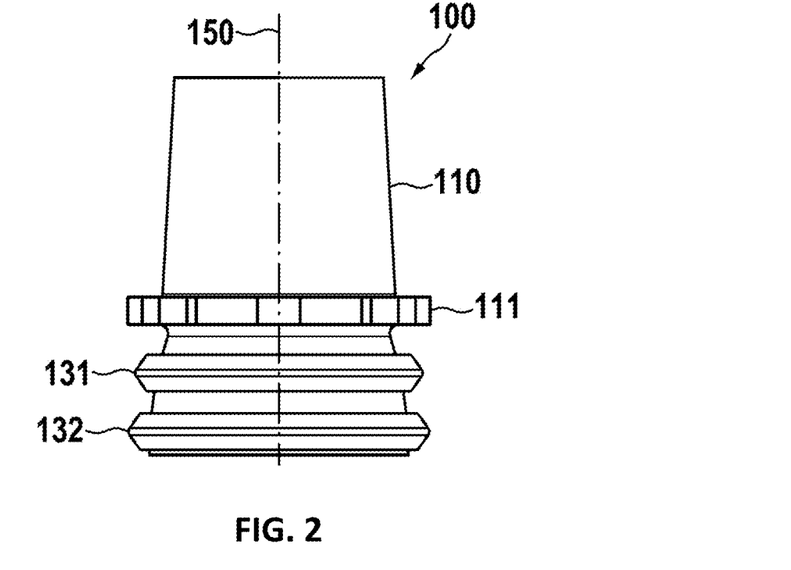
FIG. 2 shows a side view of a first embodiment.

In FIG. 2, a side view of a first embodiment is shown.

Figure 3:
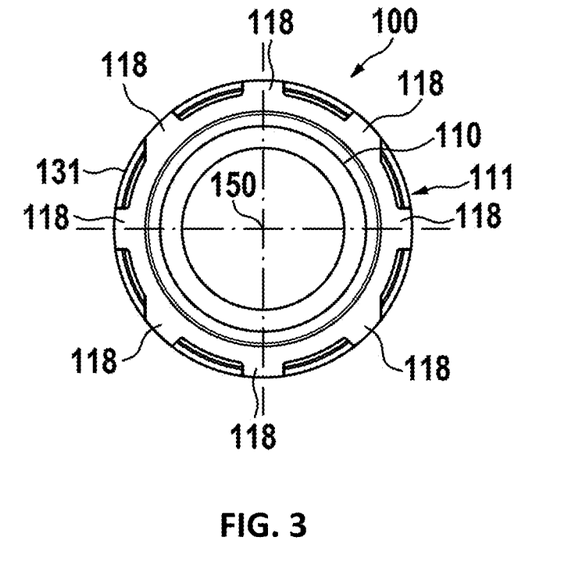
FIG. 3 shows a top view of the first embodiment.

In FIG. 3, a top view of a first embodiment is shown. Here, protrusions 118 of the torque ring 111 are shown.

Figure 4:
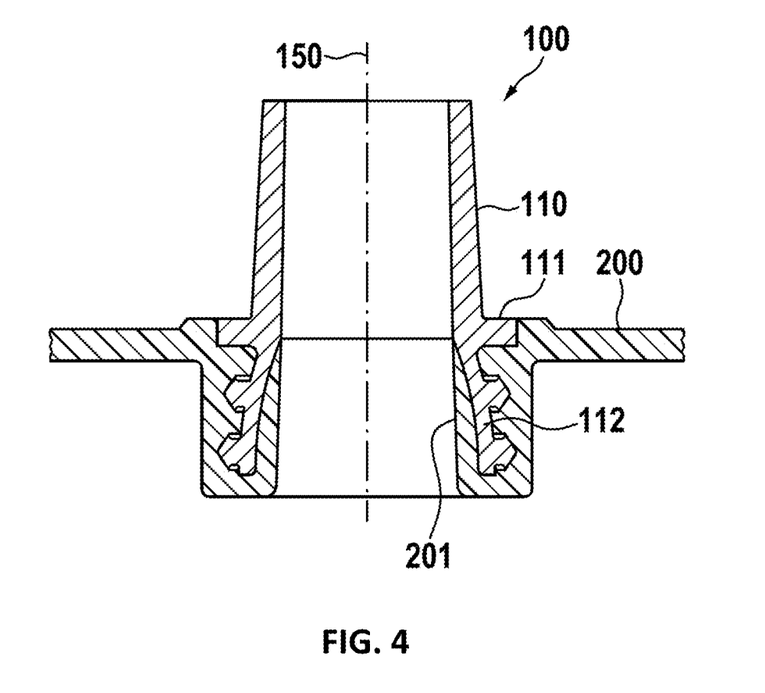
FIG. 4 shows a sectional view of a terminal embedded into a battery cover.

In FIG. 4, a sectional view of a terminal embedded into a battery cover 200 is shown. Here, the mounting section 112 of the terminal 100 is completely embedded into the battery cover material, including the outer wall and the inner wall. This improves sliding of a terminal post into the terminal during assembly, and further increases mechanical stability, as the battery cover material better supports the terminal mounting section 112.

Figure 5:
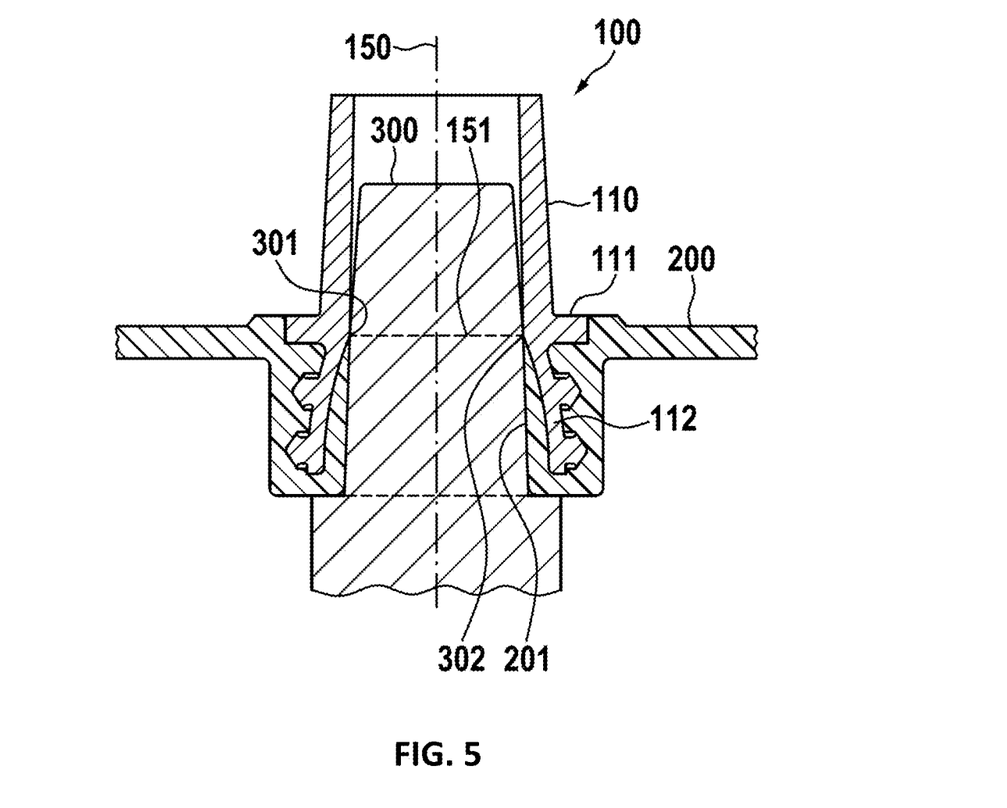
FIG. 5 shows an embodiment with an inserted molding tool post.

In FIG. 5, an embodiment with an inserted molding tool post is shown. This may be a stage during injection molding of the battery cover 200. To prevent flow of the battery cover material into the upper section of the terminal, a pin of a molding tool 300 is inserted into the terminal. The tool preferably has a conical shape and a size, such that it exactly fits to the diameter of the circular edge 151. This prevents further plastic material of the battery cover to flow beyond the circular edge. Preferably, the diameter of the pin 300 is slightly bigger than the diameter of the circular edge 151, thus slightly compressing the circular edge and achieving a better seal.

Figure 6:
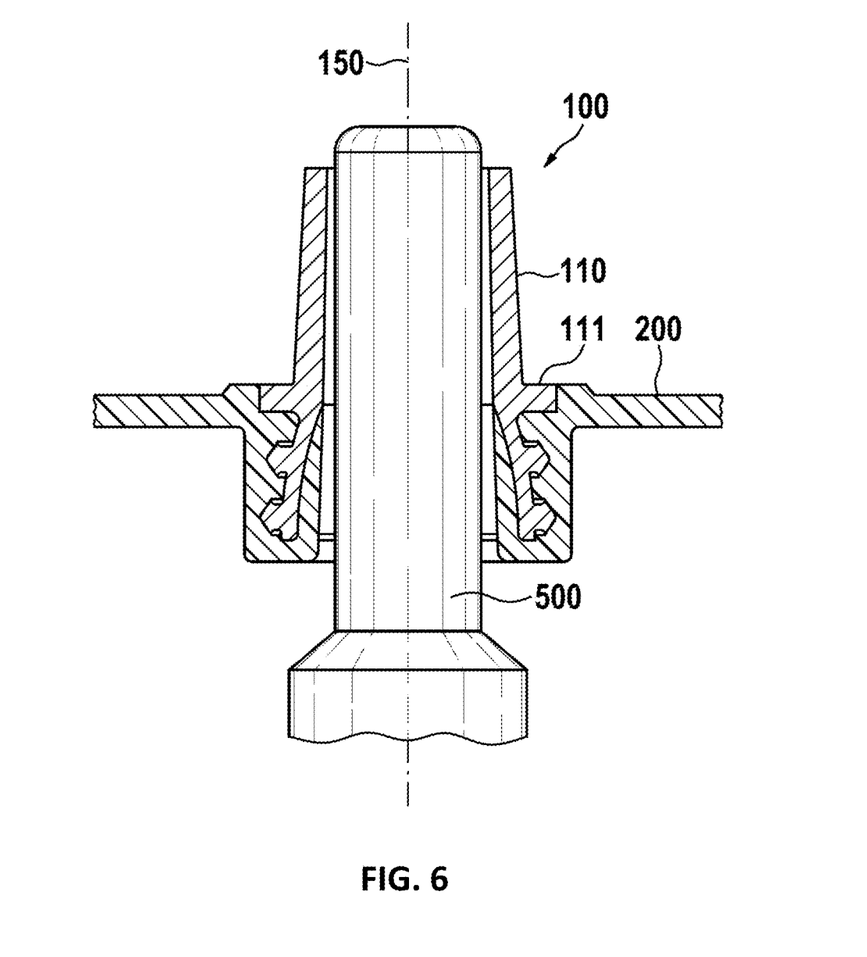
FIG. 6 shows a first embodiment of the terminal within inserted terminal post.

In FIG. 6, a first embodiment of the terminal within inserted battery terminal post 500 is shown. The battery terminal post 500 is connected to the battery cells, which are located to the bottom side and not shown. At its top side, it will be heated to melt together with the terminal and to obtain a gas-tight and electrically secure connection. The terminal post 500 has a diameter, which is slightly smaller than the inner diameter of the terminal. Preferably, the terminal post has a cylindrical shape with a diameter less than the smallest diameter of the inner wall of the terminal. Most preferably, the diameter of the terminal post is between 0.5 and 3 mm less than the diameter of the circular edge.

Figure 7:
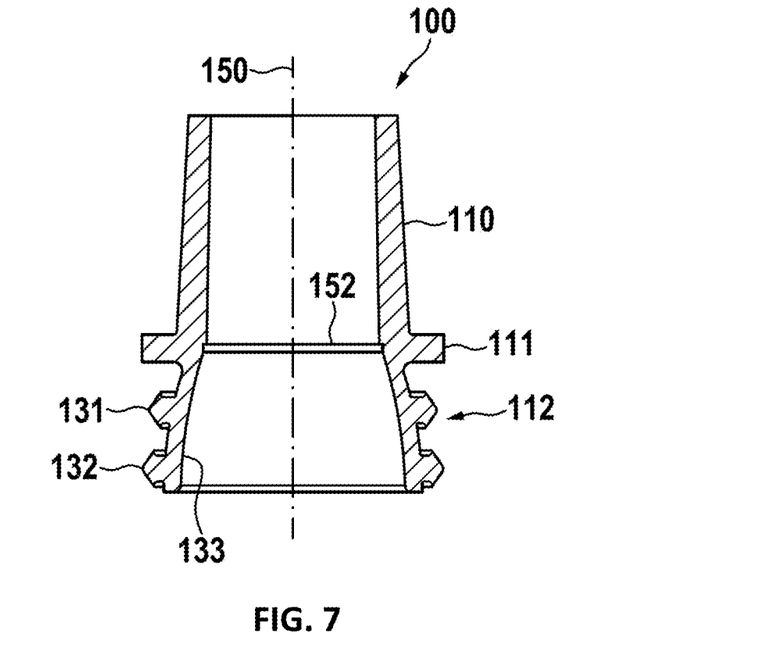
FIG. 7 shows a second embodiment of a terminal

In FIG. 7, a second embodiment of a terminal is shown. Here, instead of the circular edge, there is a step 152. This step is also suitable for sealing the terminal against the pin of the molding tool 300. It further allows a precise measurement of the length of the lower section 155.

Figure 8:
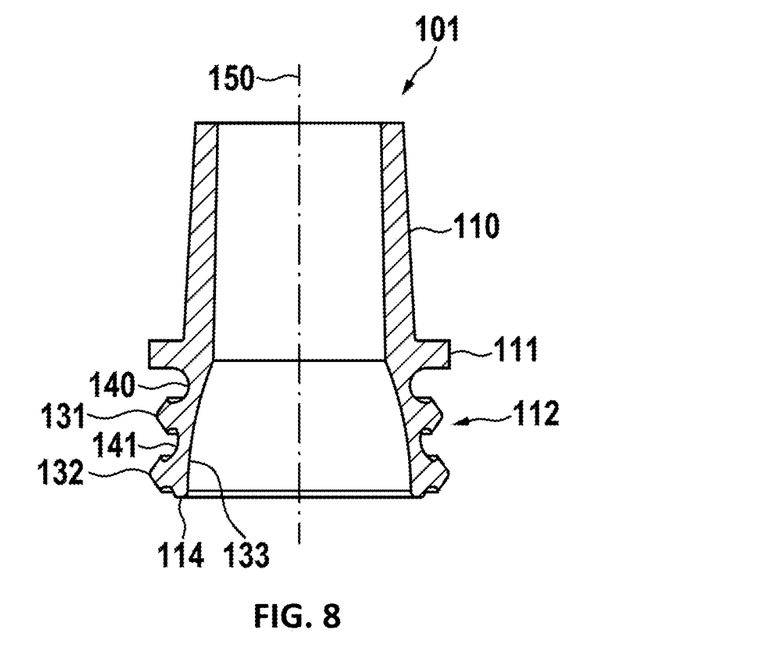
FIG. 8 shows a further embodiment.

In FIG. 8, a further embodiment is shown. Here, the mounting section 112 has a slightly modified labyrinth. Instead of having straight planes between the labyrinth rings 131, 132, there are protrusions 140 and 141 having an arch-shaped cross-section. Such arch-shaped cross-sections reduce the mechanical tensions in the material of the terminal and of the battery cover, thus increasing mechanical stability and lifetime.

Figure 9:
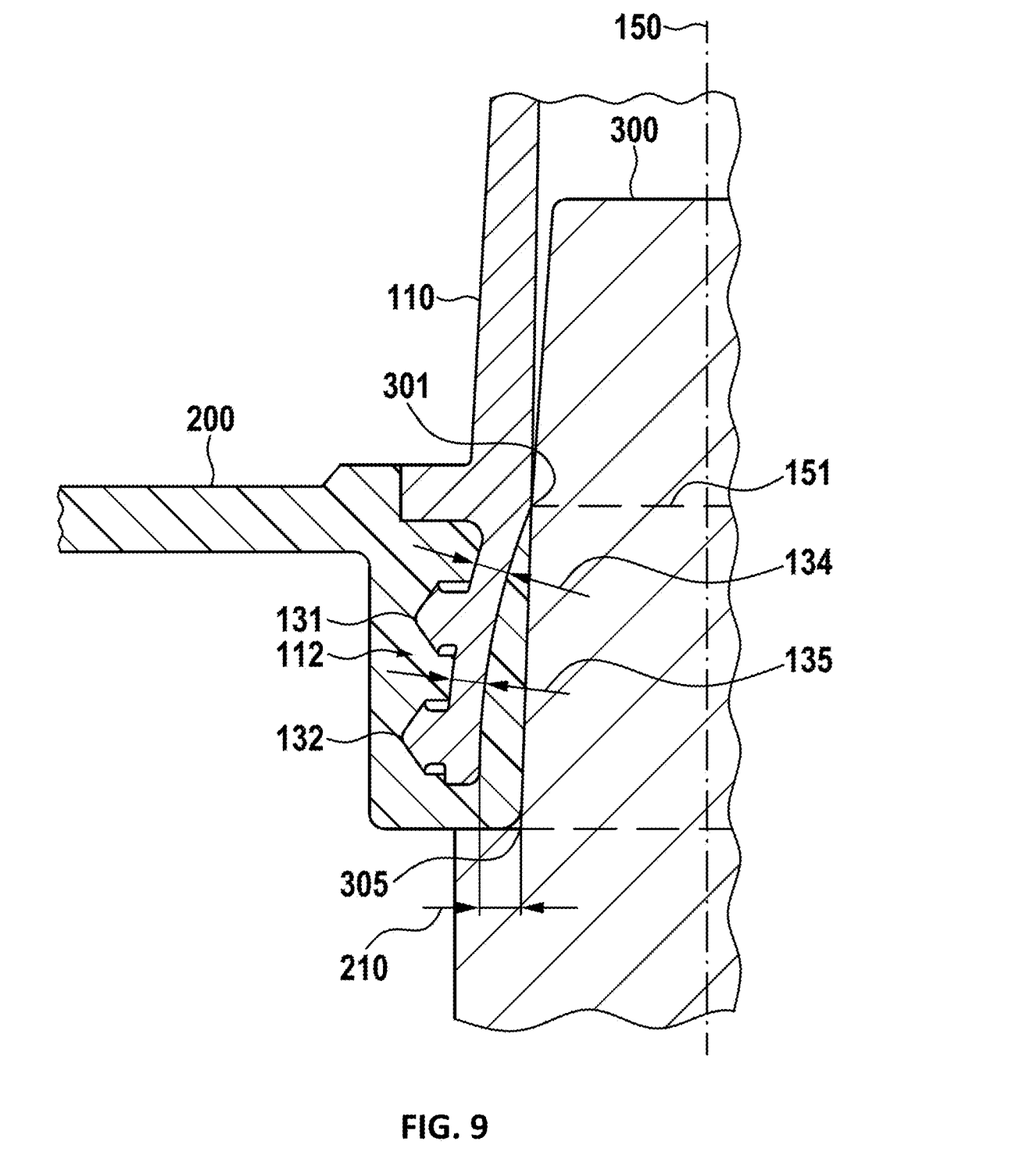
FIG. 9 shows a sectional view of an embodiment of the terminal.

In FIG. 9, a sectional view of an embodiment of the terminal is shown. Here again, the pin of the molding tool is inserted for demonstration purposes. Due to the complete enclosure of the mounting section 112 by the material of the battery cover 200, the thickness of the walls can be decreased. Therefore, it is preferred, if the thickness 134 of the wall at a first location between the torque ring and the first labyrinth ring 131 is bigger than the thickness 135 of the walls between the first labyrinth ring 131 and the second labyrinth ring 132. The maximum thickness 210 of the material of the battery cover at the inner wall of the terminal is determined by the shape of the lower section and the pin of the molding tool. It preferably is in the range between 1 and 5 mm, most preferably 2 to 3 mm.

Figure 10:
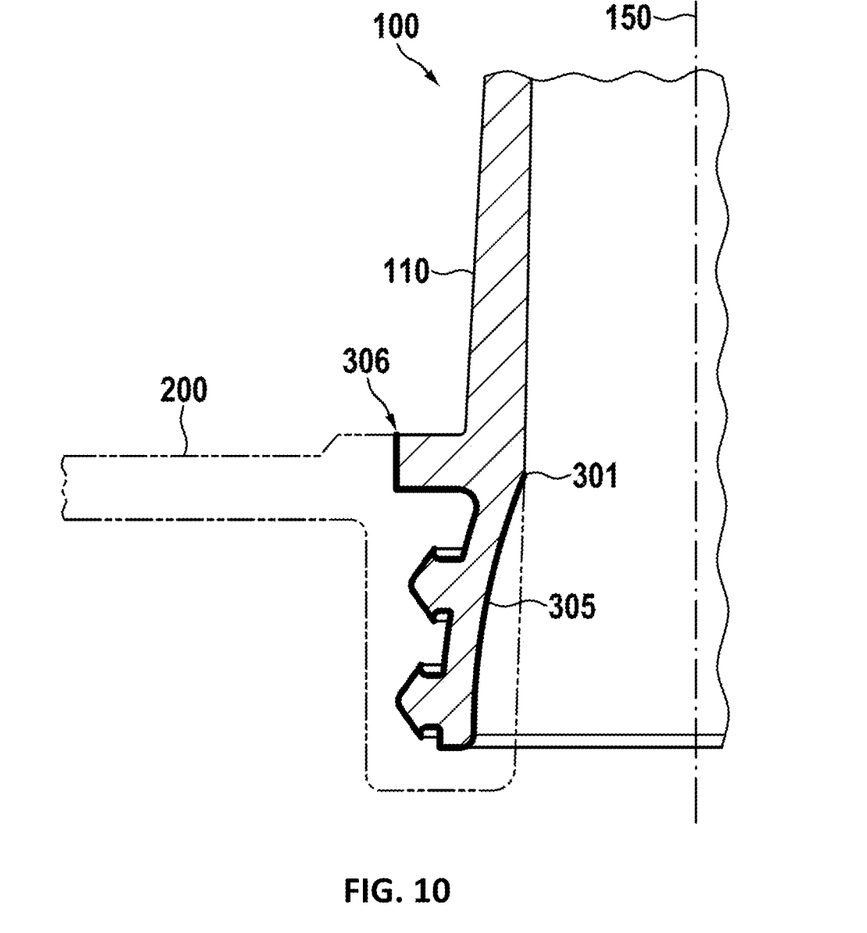
FIG. 10 shows the creeping distance between the material of the battery cover and the terminal.

In FIG. 10, the creeping distance or leakage distance between the material of the battery cover 200 and the terminal 100 is shown. The creeping path 305 through which the acid from the inside of the battery has to creep until it reaches the outside is between the points 301 and 306. This is significantly increased by the plastic material of the cover enclosing the inner wall of the mounting section.

It will be appreciated to those skilled in the art having the benefit of this disclosure that this invention is believed to provide battery terminals, battery covers, batteries and a method of molding a terminal. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 battery terminal
101 inner wall
102 outer wall
110 contacting section
111 torque ring
112 mounting section
114 bottom side of the terminal
115 upper side of the terminal
118 protrusions of the torque ring
131 first labyrinth ring
132 second labyrinth ring
134 thickness of wall between the torque ring and the first labyrinth ring
135 thickness of wall between the first and second labyrinth rings
140, 141 protrusions with arch-shaped cross-sections
150 center axis
151 circular edge
152 step
154 upper section
155 lower section
200 battery cover
210 maximum thickness
300 pin of a molding tool
301, 306 points of path for creeping of battery acid
305 creeping path
500 battery terminal post

The invention claimed is:

1. A terminal for a battery, the terminal comprising:
a hollow body having an outer surface, an inner surface, a mounting section, a contacting section, and a torque ring between the mounting section and the contacting section, wherein the outer surface has at least one labyrinth ring at the mounting section, the at least one labyrinth ring forming a labyrinth,
wherein the inner surface has:
an upper section surrounded by the contacting section,
a lower section surrounded by the mounting section, the lower section of the inner surface having a concave cross-sectional shape, and
an edge between the upper section and the lower section.

2. The terminal according to claim 1, wherein the edge of the inner surface of the hollow body is surrounded by the torque ring.

3. The terminal according to claim 1, wherein the contacting section has a frusto-conical shape with a diameter that decreases with distance from the torque ring in a direction away from the mounting section and toward an upper side of the terminal.

4. The terminal according to claim 1, wherein the mounting section has a frusto-conical shape with a diameter that increases with distance from the torque ring in a direction away from the contacting section and toward a bottom side of the terminal.

5. The terminal according to claim 1, wherein the inner surface also includes a circular step adjacent to the edge of the inner surface of the hollow body.

6. The terminal according to claim 1, wherein the mounting section has a radial thickness that decreases with distance from the torque ring toward the end of the mounting section.

7. A battery cover having at least one terminal according to claim 1.

8. The battery cover according to claim 7, wherein the at least one terminal is molded into the battery cover.

9. The battery cover according to claim 7, wherein the mounting section of the terminal is enclosed by plastic material of the battery cover.

10. The battery having at least one terminal according to claim 1.

11. A battery having a battery cover according to claim 7.

12. Method of molding a terminal according to claim 1 into a battery cover, the method comprising the steps of:
pushing a pin of a molding tool for forming a battery cover into the terminal until an outer circumference of the pin is in contact with the edge of the inner surface of the terminal,
filling the molding tool with a plastic material, and
removing the pin from the terminal.

13. Method according to claim 12, wherein the mounting section of the terminal is enclosed by the plastic material during the step of filling the molding tool with a plastic material.

* * * * *